United States Patent
Seller et al.

(10) Patent No.: US 12,143,148 B2
(45) Date of Patent: Nov. 12, 2024

(54) SPREAD SPECTRUM RECEIVER AND TESTING METHOD

(71) Applicant: Semtech Corporation, Camarillo, CA (US)

(72) Inventors: Olivier Bernard André Seller, Sainte-Soulle (FR); Fabio André Verna, Yverdon-les-bains (CH)

(73) Assignee: Semtech Corporation, Camarillo, CA (US)

( * ) Notice: Subject to any disclaimer, the term of this patent is extended or adjusted under 35 U.S.C. 154(b) by 16 days.

(21) Appl. No.: 18/113,450

(22) Filed: Feb. 23, 2023

(65) Prior Publication Data

US 2023/0291434 A1    Sep. 14, 2023

Related U.S. Application Data

(60) Provisional application No. 63/318,434, filed on Mar. 10, 2022.

(51) Int. Cl.
*H04B 1/69* (2011.01)
*H04B 17/24* (2015.01)

(52) U.S. Cl.
CPC .............. *H04B 1/69* (2013.01); *H04B 17/24* (2015.01); *H04B 2001/6912* (2013.01)

(58) Field of Classification Search
CPC .................. H04B 1/69; H04B 1/17–24; H04B 2001/6912; H04B 17/24
USPC ........................................................... 375/139
See application file for complete search history.

(56) References Cited

U.S. PATENT DOCUMENTS

| | | | |
|---|---|---|---|
| 8,406,275 B2 | 3/2013 | Sforza | |
| 2021/0184901 A1* | 6/2021 | Seller | H04L 27/265 |

FOREIGN PATENT DOCUMENTS

| | | | | |
|---|---|---|---|---|
| EP | 2449690 A1 | 5/2012 | | |
| EP | 2763321 A1 * | 8/2014 | ........ | H03M 13/2721 |
| EP | 2767847 A1 | 8/2014 | | |
| EP | 2767847 B1 * | 4/2016 | .......... | G01S 13/343 |
| EP | 3247046 A1 | 11/2017 | | |
| EP | 3264622 | 1/2018 | | |
| JP | 2004343388 A | 5/2003 | | |

OTHER PUBLICATIONS

Wang Zhe et al "online Concurrent Transmissions at LoRA Gateway", IEEE Ifocon 2020—IEEE Conference on Computer Communications, IEEE, Jul. 6, 2020 (Jul. 6, 2020), pp. 2331-2340, XP033806570 (Year: 2020).*

(Continued)

*Primary Examiner* — Kevin M Burd
(74) *Attorney, Agent, or Firm* — BLANK ROME LLP

(57) ABSTRACT

A method of characterizing a LoRa modulated signal or any such signals with a plurality of chirps as symbols. It foresees sampling and storing the signal, determining a phase of at least one chirp in the signal, and determining a timing error and/or a frequency error based on the phase, The timing error is extracted by the height of a discontinuous step in the phase at the position of the cyclical shift, while the frequency error is obtained by the slope of the phase. The method can be applied to a dedicated receiver for the characterization of LoRa transmitters.

12 Claims, 2 Drawing Sheets

(56) References Cited

OTHER PUBLICATIONS

Zhe Wang et al., Online Concurrent Transmissions at LoRa Gateway, IEEE Infocom 2020—IEEE Conference on Computer Communications, IEEE, Jul. 6, 2020 (Jul. 6, 2020), pp. 2331-2340, XP033806570, DOI: 10.1109/INFOCOM41043.2020.9155433.
European Search Report, EP23158688.4, Aug. 3, 2023, 9 pages.

* cited by examiner

SPREAD SPECTRUM RECEIVER AND TESTING METHOD

REFERENCE DATA

The present application claims the benefit of the filing date of U.S. provisional patent application 63/318,434 of Mar. 10, 2022, the contents whereof are hereby incorporated entirely.

TECHNICAL DOMAIN

The present invention concerns wireless network systems based on spread spectrum chirp-modulated signals. In particular, the present invention relates to an advanced receiver for such signals, and to a method of testing and characterizing a spread spectrum chirp-modulated transmitter.

RELATED ART

Wireless connected devices have been the object of considerable interest and effort in recent times. Improved wireless communication techniques are instrumental for the creation and the development of the "Internet of Things". In this context, several wireless communication protocols have been proposed and utilised. The LoRa™ communication system, known among others by patents EP2449690B1, EP2763321B1, EP2767847B1, EP3247046B1, and EP2449690B1, uses chirp spread-spectrum modulation to achieve long transmission ranges with low complexity and little power expenditure.

In the context of this disclosure, the wording "LoRa" indicates for brevity a communication system based on the exchange of radio signals that include a plurality of frequency chirps, each chirps being limited to a finite interval of time and an finite bandwidth, wherein the chirps include base chirps in which the frequencies follow a given function from the beginning to the end of the interval of time, and modulated chirps that are cyclical shifts of a base chirp. The base chirps and modulated chirps are taken as symbols in a modulation alphabet. This definition includes the known LoRa™ products and standards, as well as possible and yet unimplemented variants of the broad concept.

LoRa™ modulation it is used in many applications and devices, both for Low Power Wide Area Networks and for long range point to point communication. Its increasing diffusion is supported by different vendors of the core technology in chipsets, modules, and reference designs. As such, there is a need of standardizing the performances of transmitters and receivers from different sources and models, to ensure interoperability.

Interoperability is routinely tested by conventional connectivity tests of various combinations of LoRa™ transmitters and receivers. With the increase in the number of available devices, this manner of proceeding becomes impractical in the long term, because of the overwhelming number of possible combinations.

In other digital communication technologies as Wi-Fi, for example, the performance is quantified by the error vector magnitude (EVM) that is a measure of how far the transmitted constellation points deviate from the ideal locations. The EVM can be expressed as a percent of the ideal symbol amplitude, or in dB, for comparison with the signal to noise ratio. The main metrics defining the performance of LoRa transmitters are timing and frequency stability over time because frames can be very long.

Conventional LoRa receivers can obtain a comprehensive estimation of time and frequency error, but do not attempt to estimate independently these parameters. An aim of the present invention is the provision of a method for testing and characterizing transmitters and receivers for LoRa signals and measure their timing and frequency stability independently. The invention also relates to an advanced receiver architecture for LoRa signals.

SHORT DISCLOSURE OF THE INVENTION

An aim of the present invention is the provision of a method for characterizing the conformity of a LoRa signal, or of a LoRa radio-transmitting or radio-receiving device overcoming the shortcomings and limitations of the state of the art.

Another aim of the invention is quantifying the radio impairments on a particular device design. Impairments may come from phase noise, frequency instability or drift, or nonlinearities. The method provides metrics which can tell the dominant source of transmit error.

The above aims are attained by the object of the attached claims and in particular by a method of characterizing a modulated signal that includes a plurality of chirps, each chirps being limited to a finite interval of time and an finite bandwidth wherein the chirps include base chirps in which the frequencies follow a monotonic function from the beginning to the end of the interval of time and modulated chirps that are cyclical shifts of a base chirp, the method comprising sampling and storing the signal, determining a phase of at least one chirp in the signal, and determining a timing error and/or a frequency error based on the phase, the timing error being a deviation between a timing of the chirp and a nominal predetermined timing, the frequency error being a deviation between a frequency of the chirp and a nominal predetermined frequency.

Dependent claims relate to features of the invention that may be useful or advantageous without being essential. They introduce among others a signal structure with a preamble of consecutive base chirps followed by a payload of modulated chirps and diverse manners of obtaining the timing error and the frequency error from the phase and an iterative process in which the same message may be processed repeatedly in the invention, for example one first time to determine a frame structure, and then again to compute time and frequency errors for all or some symbols. When several chirps are analysed, the method may include the determination of a sampling timing drift of the transmitter. It is also advantageous to quantify the frequency stability of a transmitter through the ratio between the sampling timing drift of the transmitter and the frequency offset of each received chirp, which, ideally, should yield the centre transmit frequency.

A variant includes the synthesis of recomposed modulated chirp by applying a window to two consecutive base chirps in alternative to the received modulated chirps, whereby, the timing error and/or the frequency error are determined based on phase error that is the difference between the phase of the at least one chirp and a known phase of a nominal chirp. The timing error can be determined as proportional to a height of a step change of the phase error (corresponding to the cyclical shift), and the frequency error may be determined as proportional to a slope of the phase error.

Preferably, the determination of the phase error includes a dechirping step that consists in multiplying sample-by-sample the sampled signal by a vector representing the complex conjugate of a base chirp, applying a Fourier transform on the product of the multiplication, detecting two peaks with a frequency separation equal to the bandwidth in the result of the Fourier transform. The received chirps are preferably sampled above the Nyquist limit, with an oversampling factor of at least two between sampling frequency and signal bandwidth to resolve the peaks, but this is not strictly required.

The method of the invention can be applied to the characterization of LoRa transmitters and receivers, in the latter case through a "golden" transmitter, whose nonconformities are negligible. Preferably, the received signal are only digitized in the receiver and the samples sent to a computation server for the determination of time and frequency deviations in the computation server.

SHORT DESCRIPTION OF THE DRAWINGS

Exemplar embodiments of the invention are disclosed in the description and illustrated by the drawings in which:

FIG. 1 shows, in schematic simplified fashion, the structure of a radio modem according to one aspect of the present invention.

FIG. 2a plots the instantaneous frequency of a base chirp and of a modulated chirp according to one aspect of the invention. The phase of the same signals is represented in FIG. 2b, and FIG. 2c plots the real and of the complex component of the base chirp and of a modulated chirp, in the time domain, and in the baseband representation.

FIGS. 3a and 3b compare the instantaneous frequency of a base chirp with that of a modulated one.

EXAMPLES OF EMBODIMENTS OF THE PRESENT INVENTION

Figure 1:
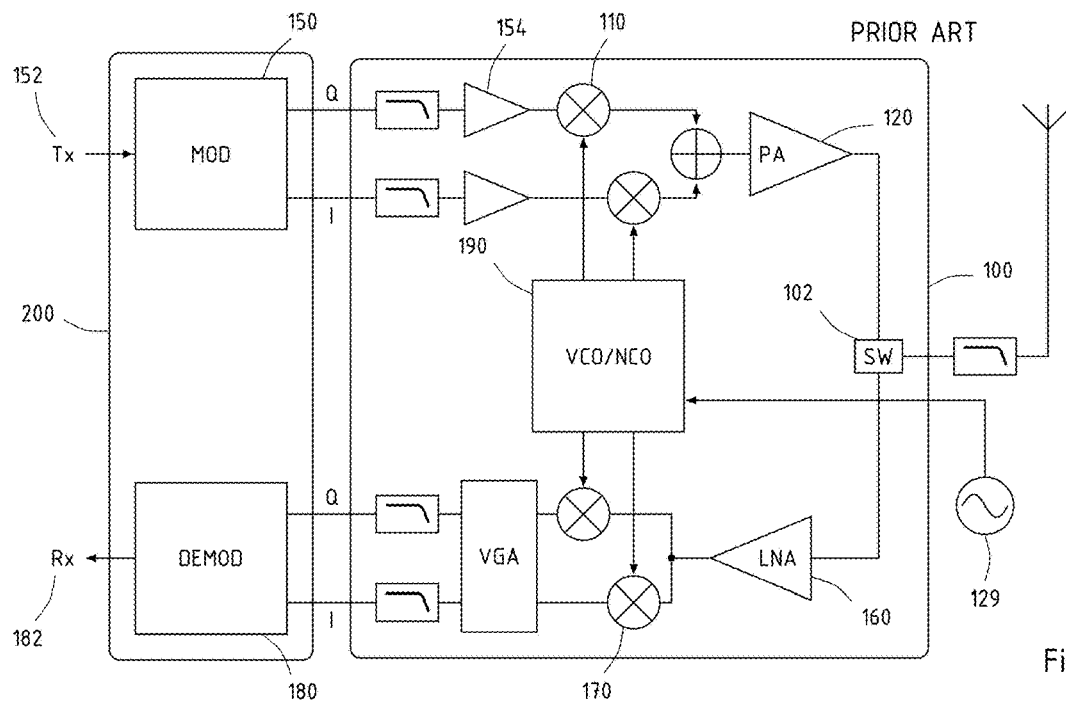

Several aspects of the chirp modulation technique employed in the present invention are described in European Patent EP2449690B1, which is hereby incorporated by reference, and will be reminded here summarily. The radio transceiver that is schematically represented in FIG. 1 is a possible embodiment of the invention. The transceiver includes a baseband section 200 and a radiofrequency section 100. It includes a baseband modulator 150 that generates a baseband complex signal based on the digital data 152 at its input. This is then converted to the desired transmission frequency by the RF section 100, amplified by the power amplifier 120, and transmitted by the antenna through the RF Switch 102.

Once the signal is received on the other end of the radio link, it is processed by the receiving part of the transceiver of FIG. 1 that comprises a low noise amplifier 160 followed to a down-conversion stage 170 that generates a baseband signal (which is again a complex signal represented, for example by two components I, Q comprising a series of chirps, then treated by the baseband processor 180, whose function is the reverse of that of the modulator 150, and provides a reconstructed digital signal 182.

As discussed in EP2449690, the signal to be processed comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile f(t) of their instantaneous frequency or also by the function $\phi(t)$ defining the phase of the signal as a function of the time. Importantly, the processor 180 is arranged to process and recognize chirps having a plurality of different profiles, each corresponding to a symbol in a predetermined modulation alphabet.

Figure 2A:
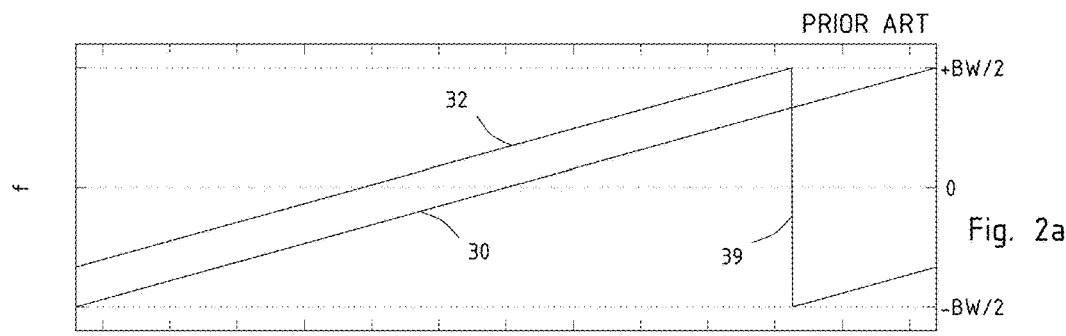
Figure 2B:
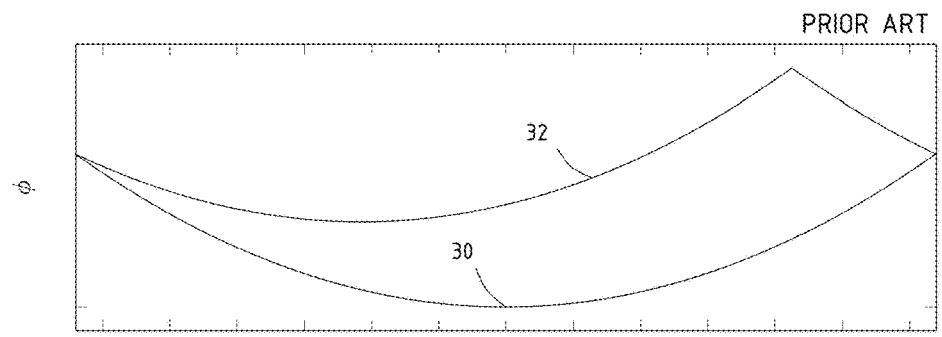
Figure 2C:
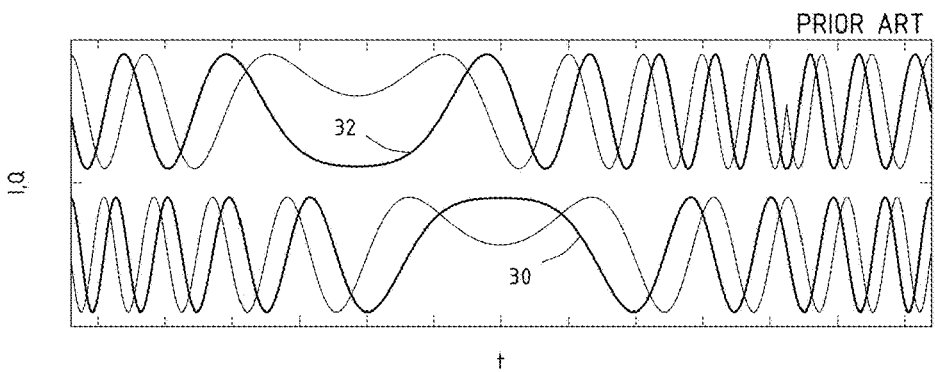

According to an important feature of the invention, the received signal Rx can comprise base chirp (also called unmodulated chirps in the following) that have specific and predefined frequency profile, or one out of a set of possible modulated chirps, obtained from base chirps by time-shifting cyclically the base frequency profile. FIGS. 2a and 2b illustrate, by way of example, possible frequency and phase profiles of a base chirp 30 and of one modulated chirp 32 between the time instant $t=t_0$ at the beginning of a chirp and the instant $t=t_1$ at the end of the chirp, while FIG. 2c shows the corresponding baseband signals in the domain of time. The horizontal scale corresponds for example to a symbol and, although the plots are drawn as continuous, they in fact represent a finite number of discrete samples, in a concrete implementation. As to the vertical scales, they are normalized to the intended bandwidth or to the corresponding phase span. The phase is represented in FIG. 2b as if it were an unbounded variable, but it may in fact span across several revolutions in a concrete implementation.

In the example depicted, the frequency of a base chirps increases linearly from an initial value $-BW/2$ to a final value $BW/2$ where BW denotes the bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol or, otherwise said, the processor 180 needs to process a signal that comprises a plurality of frequency chirps that are cyclically time-shifted replicas of a base chirp profile, and extract a message that is encoded in the succession of said time-shifts.

The signal may include also conjugate chirps that are complex conjugate of the base unmodulated chirp. One can regard these as down-chirps, in which the frequency falls from $BW/2$ to $-BW/2$.

The operation of evaluating a time shift of a received chirp with respect to a local time reference may be referred to in the following as "dechirping" and can be carried out advantageously by a de-spreading step that involves multiplying the received chirp by a complex conjugate of a locally generated base chirp, sample by sample. This produces an oscillating digital signal whose main frequency can be shown to be proportional to the cyclic shift of the received chirp. The demodulation may involve then a Fourier transform of the de-spread signal. The position of the maximum of the Fourier is a measure of the cyclic shift and of the modulation value. In mathematical terms, denoting the k-th received symbol with $S_j^k$, the corresponding modulation value is given by $m(k)=\arg\max_n(|X(k,n)|)$ where $X(n,k)=\mathcal{F}(S_j^k \cdot \overline{b}_j)$ denotes the Fourier transform of the product between $S_j^k$ and the conjugate of a base chirp $\overline{b}_j$. Other manners of demodulating the signal and extracting the cyclic shift of each symbol are possible, however.

Normal LoRa demodulation does not require an explicit extraction of the phase values represented in the plot of FIG. 2b. The present invention concerns an advantageous method of analysing LoRa signals using the phase information. To this purpose, the phase of the can be computed as a time series of digital values from the received signals $S_j^k$ with known techniques.

In a variant of the invention, the characterization of a received chirped LoRa signal may use a special receiver configured to receive a radio signal and process it by the following operations/steps.

As disclosed in EP2449690 and EP2763321, including a preamble of identical preferably unmodulated chirps is advantageous for the detection. The device receiving this signal applies the dechirping process described above and look for a peak in the FFT spectrum above the noise. The detection of the peak tells the receiver that a LoRa signal has been received, and the position of this peak indicates a timing and frequency offset that exists between the transmitter and receiver system. To enhance sensitivity, the receiver may be configured to adds the FFT output of several consecutive identical chirps in the preamble, in the complex domain.

As disclosed in EP2763321, the receiver may be configured to improve the time and frequency synchronization by looking at other special features of the preamble, such as symbols having a predetermined value of cyclical shift, and conjugate (descending) symbols. The receiver may be configured also to improve the synchronization figures by comparing the FFT peak resulting from different symbols spaced apart in time.

In the frame of the present invention, the receiver is configured to determine the timing error making use of the method disclosed in the cited references and track the timing and/or frequency error along the data frame, or at least along the preamble, and track them by a suitable tracking algorithm. The characterization may be further improver through the application of a systematic offset to the synthesized chirps based on the estimated crystal error.

According to an aspect of the invention, the receiver is configured to analyse a received frame of data as outlined above, and then repeat the analysis on the same series of digital data to determine the phase of at least one chirp, but preferably of several chirps in the received signal with improved reliability.

Preferably in the invention, the digital representation of the received chirps is oversampled. While normal LoRa receivers adopt customarily a sampling frequency equal to the bandwidth BW of the incoming chirps, the receivers used in the present invention sample the incoming chirps at a frequency at least double the bandwidth.

Figure 3A:
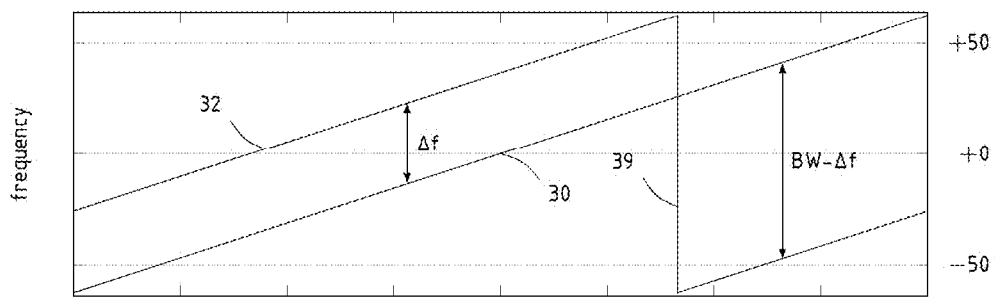
Figure 3B:
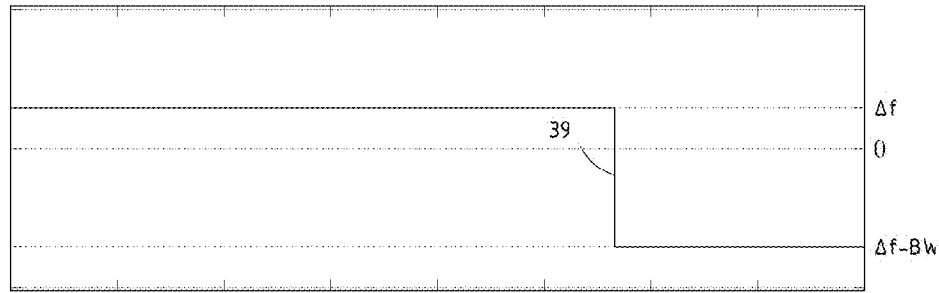

FIG. 3a represents the instantaneous frequency of a modulated chirp 32 and that of a base chirp 30, the modulated signal can be divided into two continuous parts: a first part before the discontinuity 39 with a frequency higher than that of the reference chirp 30 by a constant shift $\Delta f$, and the second part after the discontinuity with a frequency lower than that of the reference chirp 30 by a shift equal to BW$-\Delta f$. In the dechirping process the multiplication by the conjugate of a base chirp $\overline{b}_j$, will yield (FIG. 3b) a signal with constant positive frequency $\Delta f$ followed by a signal with constant negative frequency $\Delta f-$BW. If the signals were sampled at a frequency equal to BW (the Nyquist frequency) these positive and negative component would be aliased into one peak. By means of oversampling, the positive frequency peak and the negative frequency peak can be separated.

The receiver of the invention is preferably configured to look for pairs of peaks in the FFT resulting for the processing of an oversampled signal. The peak positions are interdependent, since it must hold f2=f1$-$BW, as seen above. Therefore, the receiver may be configured to sum (incoherently) the content of corresponding bins in the positive and negative frequencies.

The incoherent sum may be improved by using the fact that the relative amplitudes of the two peaks are determined a priori by the modulation value in a predictable way. Symbols having a cyclical shift close to N/2 will have the discontinuity 39 close to the middle of the symbol, therefore the FFT will exhibit two peaks with approximately the same amplitude, whereas symbols where the cyclical shift is close to the extreme values 0 and N will show a large peak and a much smaller one, the amplitudes being proportional to the length of the segment before and after the discontinuity.

Importantly, in this second step of analysis, the phase of the received signal and its time development are determined and compared with a nominal phase function to provide a phase error. The phase of the received signal may include an unknown constant offset, which can be set to an arbitrary value without consequences, as it will be seen in the following.

Figure 4:
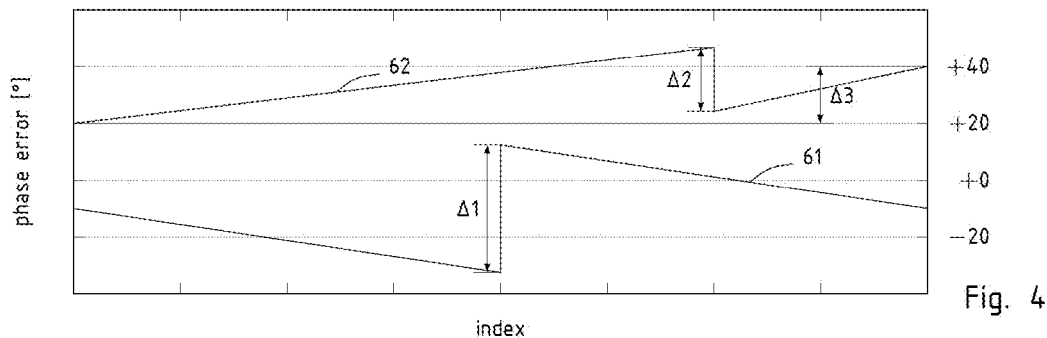
FIG. 4 is a plot showing a phase error of LoRa signal having nonconformities in timing and frequency.

FIG. 4 is a plot of the phase errors expected from a transmitter with a timing error (plot 61) and from a transmitter with a timing and a frequency error (plot 62) The phase error expected from a perfectly aligned transmitter would be a constant and is not plotted. The plot disregards noise. This is an acceptable simplification because in most testing procedures the transmitter and the receiver are close, and the S/N is high.

Plot 61 show an example in which the analysed chirp has a modulation of 512 for a spreading factor N=1024, hence the discontinuity is in the middle of the chirp and has a timing error equal to ⅛ of sample. Denoting the received symbol with BW$-\Delta f$ and the transmitted symbol with $\Delta f$ in the continuous representation, where $\Delta f-$BW is the starting of a symbol, if neither timing error nor frequency error is present, then it will be BW. If there is a timing error R($t_0$+t) then we will have, after sampling, T($t_0$+t), where $t_0$ is the sample index.

If one considers the sample R($t_0$+t)=T($t_0$+t) just before the discontinuity, and the sample $\Delta t$ just after the discontinuity, the instantaneous frequency, that is the time derivative of the phase, will be very close to R($t_0$+k/BW)=T($t_0+\Delta t$+k/BW) for the former, and very close to k for the latter. Accordingly, one can write that $$R\left(t_0 + \frac{k_{before}}{BW}\right) = T\left(t_0 + \frac{k_{before}}{BW}\right)\exp(-i\pi BW\Delta t),$$

and that $$R\left(t_0 + \frac{k_{after}}{BW}\right) = T\left(t_0 + \frac{k_{after}}{BW}\right)\exp(-i\pi BW\Delta t)$$

This means that a sampling error $\Delta t$ introduces a phase error having opposite signs before and after the frequency discontinuity. The phase error has a step at the instant of the frequency jump indicated by $\Delta 1$ in FIG. 4, and the height of the step is directly proportional to the sampling error $\Delta t$. Thanks to this, the receiver of the invention can obtain an independent estimation of the sampling error.

The frequency error introduces a phase error that is linear with time. This is visible in the plot 62 that represents a symbol with cyclical shift 896, for a spreading factor 1024, a timing error of 1/16 of a sample, and a frequency error. The timing error gives the step $\Delta 2$. The frequency error is directly proportional to the difference $\Delta 3$ in phase error between the first and the last sample. In this way, the receiver of the invention can obtain an independent estimation of the frequency error from the phase error.

Figure 5:
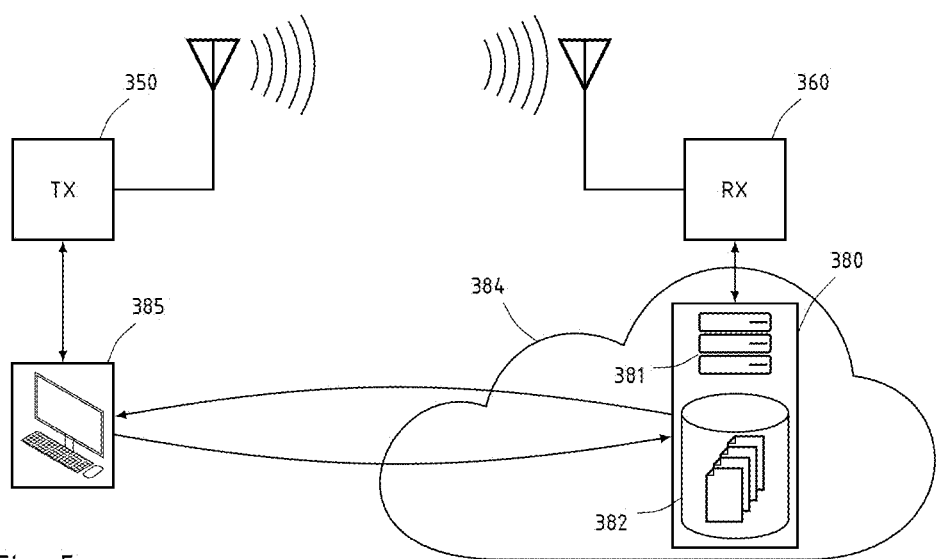
FIG. 5 illustrates schematically a system for the characterization of LoRa Transmitters and/or receivers.

FIG. 5 illustrates a possible implementation of the invention in a system to characterize a transmitter 350. the transmitter is controlled by a workstation 385 and sends a LoRa packet to a receiver 360 that is configured to carry out the signal processing disclosed above and to determine the conformity of the received signal to various specification, including the frequency error and the timing error. The frequency error and the timing error are determined based on the phase error function described above, for example the frequency error as proportional to a phase error difference between the beginning of an error of the symbol and the timing error as proportional to a step in the phase error at the position of the frequency jump.

The data processing in the receiver 360 is carried out automatically in a server 380 that captures the digital baseband I, Q signals from the receiver 360, using a collection of programmed scripts 382. The result may be transmitted to the workstation via a secured transmission in a wan 384, which could be the internet.

Preferably, the receiver is configured to automatically compensate the frequency and phase error, as well as timing offset and sampling timing drift in the captured signal. The sampling and sampling drift compensation is preferably computed using a time interpolation. The receiver may be configured to compute the transmitter accuracy metric is computed after the compensations have been applied to the captured signal.

The receiver of the invention can determine independently the timing error and the frequency error in several LoRa symbols (i.e. chirps) received in succession from a given transmitter or even in all the LoRa symbols received from a given transmitter. Preferably, the receiver is configured to track the drift of these errors in time. The variation of the timing error within the captured data yields the sample timing drift. For any symbol within the captured data, the ratio of sample timing drift to the frequency offset is computed. It is expected that sample timing drift and frequency error should be interrelated, since both sample timing and frequency synthesis are usually driven by a same frequency reference in the transmitter. Accordingly, frequency offset shall be equal to the centre transmit frequency multiplied by the sample timing drift and the ratio mentioned above should give the centre transmit frequency. The receiver of the invention may be configured to track variations of the ratio around this expected value, and these will give a measure of the frequency consistency in the transmitter.

The frequency reference drift is a measure of the variations of the frequency reference over the capture data. It consists in two indicators, one computed from the estimated frequency offset variations, and one from the estimated sample timing drift.

The modulator bandwidth losses are a measure of the transmitter accuracy losses caused by limited modulator bandwidth. This is measured after frequency and time compensation, and from the demodulated value. The received signal is compared to an ideal transmitted signal with same sequence of modulation values, keeping only the samples corresponding to the frequency jumps.

The system disclosed can be used to characterize the performances of a transmitter against a high-quality calibrated receiver, or else to characterise a receiver, using a calibrated "golden" transmitter.

REFERENCE SYMBOLS IN THE FIGURES 30 base chirp
32 modulated chirp
39 frequency jump
61 phase error with timing error
62 phase error with timing and frequency error
100 RF section
102 RF switch
110 Frequency conversion
120 Power amplifier
129 oscillator, timebase
150 modulator
152 digital signal to transmit
154 buffer
160 LNA
170 down-conversion stage
180 processor, demodulator
182 reconstructed digital signal
190 controlled oscillator
200 baseband section
350 transmitter
385 workstation
360 receiver
380 server
381 computing unit
382 scripts
384 internet

The invention claimed is:

1. A method of characterizing a modulated signal that includes a plurality of chirps, each chirps being limited to a finite interval of time and an finite bandwidth, wherein the chirps include base chirps in which the frequencies follow a monotonic function from the beginning to the end of the interval of time and modulated chirps that are cyclical shifts of a base chirp, the method comprising sampling and storing the signal, determining a phase of at least one chirp in the signal, and determining a timing error and/or a frequency error based on the phase, the timing error being a deviation between a timing of the chirp and a nominal predetermined timing, the frequency error being a deviation between a frequency of the chirp and a nominal predetermined frequency, the at least one chirp being a modulated chirp or a recomposed modulated chirp obtained by applying a window to two consecutive base chirps, and the timing error and/or the frequency error are determined based on a phase error that is the difference between the phase of the at least one chirp and a known phase of a nominal chirp.

2. The method of claim 1, the signal comprising a preamble of consecutive base chirps followed by a payload of modulated chirps.

3. The method of claim 1, the timing error being determined as proportional to a height of a step change of the phase error.

4. The method of claim 1, the frequency error being determined as proportional to a slope of the phase error.

5. The method of claim 1, wherein the sampling has a sampling frequency that is at least the double of the bandwidth, the method including multiplying sample-by-sample the sampled signal by a vector representing the complex conjugate of a base chirp, applying a Fourier transform on the product of the multiplication, detecting two peaks with a frequency separation equal to the bandwidth in the result of the Fourier transform.

6. The method of claim 1, wherein the signal is processed repeatedly.

7. The method of claim 1, including transmitting the signal with a radio-transmitting device, receiving, and sampling the signal in a radio-receiving device, transmitting the sampled signal to a computation server, the time and frequency deviations being determined in the computation server.

8. The method of claim 1, comprising determining the timing errors of a plurality of chirps received from a given transmitter and determining a sampling timing drift of the transmitter based on the timing errors.

9. The method of claim 8, comprising determining, for each received chirp a ratio of the sampling timing drift of the transmitter to the frequency offset of the received chirp and using the ratio as a measure of the frequency stability in the transmitter.

10. A method of characterizing the performance of a radio-transmitting device, comprising receiving a signal generated by the radio-transmitting device with a reference radio-receiving device and determining a timing error and/or a frequency error by the method of claim 1.

11. A method of characterizing the performance of a radio-receiving device, comprising generating a signal with a reference radio-transmitting device, receiving the signal with the radio-receiving device and determining a timing error and/or a frequency error by the method of claim 1.

12. A radio-receiving device for LoRa signals configured to carry out the method of claim 1.

\* \* \* \* \*